(12) United States Patent
Rosenzweig et al.

(10) Patent No.: US 7,020,848 B2
(45) Date of Patent: Mar. 28, 2006

(54) COMPREHENSIVE, MULTI-DIMENSIONAL GRAPHICAL USER INTERFACE USING PICTURE METADATA FOR NAVIGATING AND RETRIEVING PICTURES IN A PICTURE DATABASE

(75) Inventors: Elizabeth Rosenzweig, Newton, MA (US); Prasad V. Prabhu, Macedon, NY (US); Douglas B. Beaudet, Geneseo, NY (US)

(73) Assignee: Eastman Kodak Company, Rochester, NY (US)

( * ) Notice: Subject to any disclaimer, the term of this patent is extended or adjusted under 35 U.S.C. 154(b) by 646 days.

(21) Appl. No.: 09/745,025

(22) Filed: Dec. 20, 2000

(65) Prior Publication Data

US 2002/0075330 A1 Jun. 20, 2002

(51) Int. Cl.
*G06K 15/00* (2006.01)

(52) U.S. Cl. ...................................... 715/855; 715/805
(58) Field of Classification Search ........ 715/853–855, 715/805, 734–737, 748–749, 771–773, 968; 345/719–722, 708–713, 734–740, 853–855, 345/837–839
See application file for complete search history.

(56) References Cited

U.S. PATENT DOCUMENTS

| | | | |
|---|---|---|---|
| 5,493,677 A * | 2/1996 | Balogh et al. | 345/721 |
| 5,517,605 A * | 5/1996 | Wolf | 345/721 |
| 6,252,588 B1 * | 6/2001 | Dawson | 715/752 |
| 6,335,742 B1 * | 1/2002 | Takemoto | 345/781 |
| 6,366,296 B1 * | 4/2002 | Boreczky et al. | 345/719 |
| 6,532,312 B1 * | 3/2003 | Corkran | 382/284 |
| 6,567,980 B1 * | 5/2003 | Jain et al. | 725/61 |
| 6,613,100 B1 * | 9/2003 | Miller | 715/526 |
| 6,664,980 B1 * | 12/2003 | Bryan et al. | 715/738 |
| 6,784,925 B1 * | 8/2004 | Tomat et al. | 348/207.11 |
| 2002/0032696 A1 * | 3/2002 | Takiguchi et al. | 707/500.1 |

* cited by examiner

Primary Examiner—Steven Sax
(74) Attorney, Agent, or Firm—David M. Woods

(57) ABSTRACT

A comprehensive, multi-dimensional graphical user interface (GUI) using metadata provides for multiple methods and displays for browsing and retrieving pictures in a picture database. The main level display 100, which is linked to other level displays has in the preferred embodiment, a hierarchical picture grouping iconic region (104) with directories and files containing pictures in the database, a main display area (102) for displaying pictures, thumbnails and graphical browsers, a picture content iconic region (106) according to predefined content categories and picture metadata, and a graphical browser region (108) having indicia of the graphical browsers utilized by the GUI. In addition to the main level (100), the present-inventive GUI also has a number of display levels linked to the main display level (100) via one or more icons (104, 106, 108 and 110) in the main display level.

21 Claims, 6 Drawing Sheets

COMPREHENSIVE, MULTI-DIMENSIONAL GRAPHICAL USER INTERFACE USING PICTURE METADATA FOR NAVIGATING AND RETRIEVING PICTURES IN A PICTURE DATABASE

FIELD OF THE INVENTION

The present invention relates to graphical user interfaces in general, and in particular to graphical user interfaces adapted for browsing and retrieving pictures in digital picture databases.

BACKGROUND OF THE INVENTION

Digital pictures and digital picture albums/collections are proliferating with recent advances in quality and cost reductions. Digital pictures can be stored in common or individual databases that allow a user to retrieve his or her pictures for viewing and reproduction via a computer system. When a large number of pictures are stored in a collection, it is desirable to be able to browse and retrieve selected pictures with a graphical user interface (GUI). Used for such an application, a GUI conveniently organizes and groups database pictures, and allows a user to browse the pictures in one or more displays.

Along with the digital information representing pictures, digital image files can also contain metadata, or information not displayed, which nonetheless characterizes the data comprising the pictures. The metadata can describe the scene in the picture, such as a caption, and can also provide in a straightforward manner, information such as the date and time the picture was captured, the location from which the picture was captured, identify people or objects in the picture, and information regarding format and data structure.

Many prior art digital cameras can be programmed to automatically store along with the actual image, the date and time a picture was captured. More advanced digital cameras can also be programmed to automatically store along with the actual image, the location of picture capture by harnessing automatic location systems. For example, the Global Positioning Satellite (GPS) is a well-known method for pinpointing the location of a special GPS receiver with a fairly high degree of accuracy. Other methods include the use of Radio Triangulation (RT) systems. Using such an approach, a GPS receiver can be either incorporated in the hardware of the digital camera, or located nearby. A subsequent image file will contain not only the raw image data, but also a date and time stamp, along with header information related to the location of the GPS receiver when the image is collected.

Still more advanced digital cameras may contain pattern recognition software for identifying objects and people in an image, and converting such information to metadata.

Whether metadata is entered automatically by the camera, manually via the camera during picture captures, or subsequently into the digital image database, there remains a great need for improved GUIs for efficiently and attractively arranging pictures in a digital image database.

A number of recently introduced GUIs provide picture database users with different methods for navigating and retrieving database pictures. Some navigation methods may work better than others, depending on the circumstances. It would therefore be desirable to give a picture database user the option to use multiple navigation methods for a more robust system. It would also be desirable to conveniently link the different navigation methods in a user-friendly way.

More particularly, there is a great unmet need to provide a comprehensive graphical user interface for browsing and retrieving pictures in a digital picture database, which incorporates multiple methods of picture navigation, and in which displays corresponding to said multiple picture navigation methods are accessible via a linked, user-friendly main display level.

SUMMARY OF THE INVENTION

To address the unmet needs of the prior art identified supra, the present invention provides a graphical user interface (GUI) adapted to browse pictures stored in a picture database. The GUI at least includes a main level display and a plurality of display levels linked to the main display level via one or more icons in the main display level. The main display level provides links to the other display levels, and at least includes: a hierarchical picture grouping iconic region indicating directories, folders and files containing pictures from the database; at least one main display area adapted to at least display pictures, thumbnails and graphical browsers; a picture content iconic region, at least including icons representing pictures in the picture database according to predefined content categories and picture metadata; and a graphical browser region, at least including indicia of graphical browsers utilized by the GUI.

BRIEF DESCRIPTION OF THE DRAWINGS

Features and advantages of the present invention will become apparent to those skilled in the art from the description below, with reference to the following drawing figures, in which.

DETAILED DESCRIPTION OF THE INVENTION

As will be described below in more detail, the present invention novelly provides a multi-dimensional graphical user interface (GUI) which uses a comprehensive primary/main display level linked to a number of secondary/second display levels. The main display level gives the user broad picture navigation capabilities using several methods of picture navigation that are novel in their own right. Icons in the main display can be activated to link to a second display level utilizing navigation methods identified in the main display level.

Figure 1:
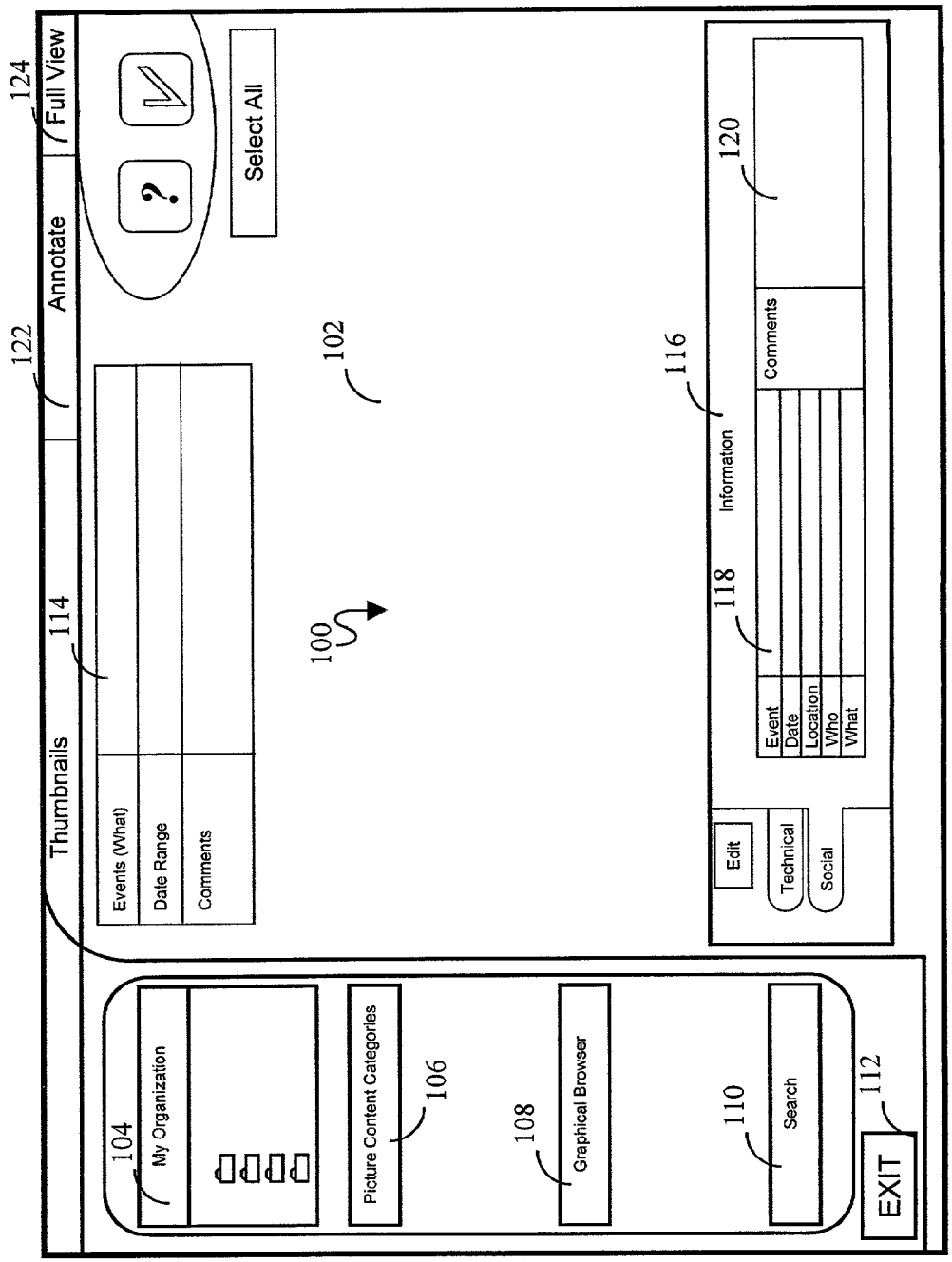
FIG. 1 is an example of the main display level/screen of the graphical user interface (GUI) of the present invention.

The main display or main display level 100 in FIG. 1 shows the comprehensive navigation capability of the present-inventive GUI. There is a main display area 102, along with four navigation method areas 104, 106, 108 and 110. The main display level 100 also includes other features, such as an "exit" button 112 to exit the main level display (and GUI) when desired, a thumbnail explanation area 114 for displaying particular details about thumbnails of pictures displayed in the display area 102, as well as an information box 116.

Although the information box is a matter of design choice, the preferred embodiment includes an area 118 for specific information about pictures identified, and a comment area 120 for comments previously stored by a user, or derived from picture metadata. The display can be in the form of a full view by activating the "full view" button 124, or in the form of an annotation view by activating the "annotation" button 122.

Figure 2:
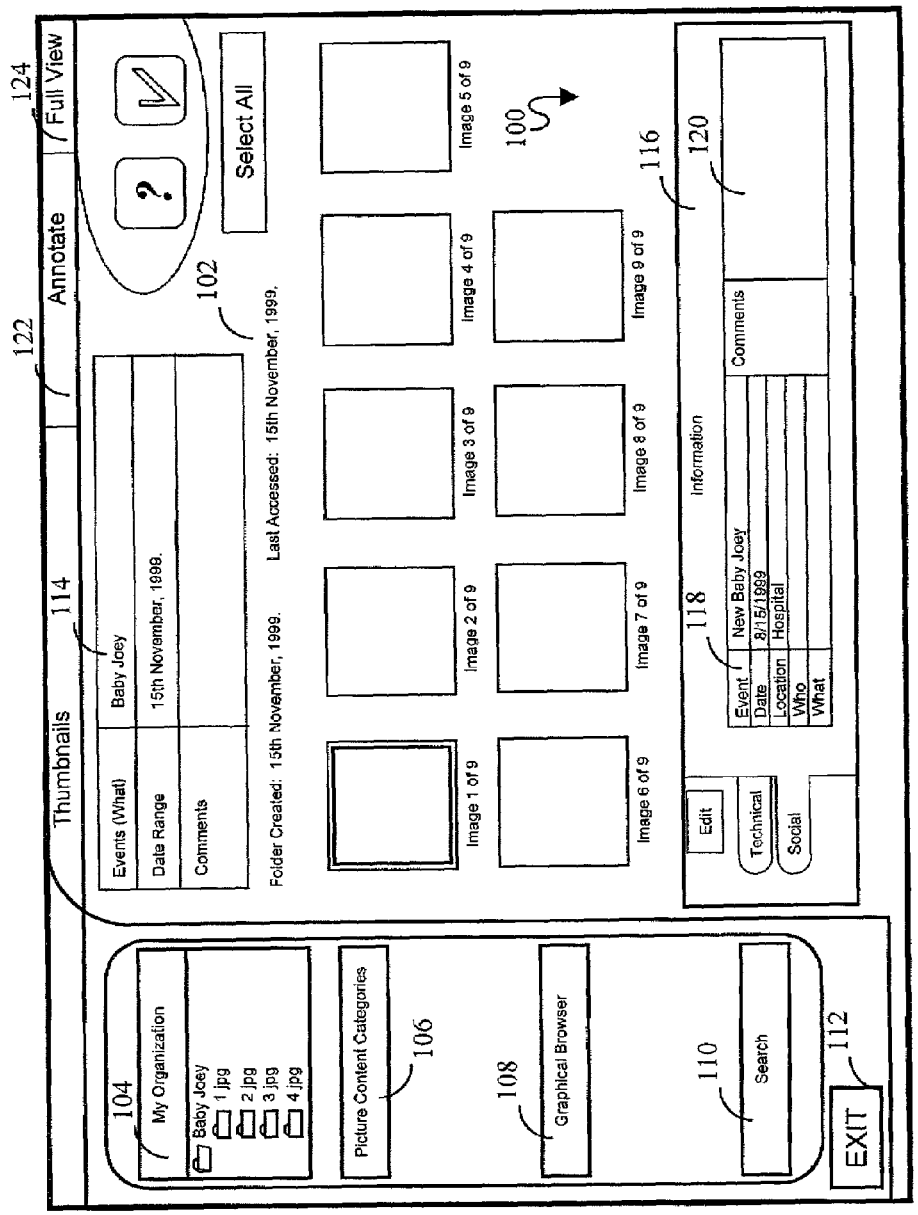
FIG. 2 is an example of a second display level of the present invention, highlighting a hierarchical picture grouping iconic region indicating directories, folders and files containing pictures from a picture database, and including thumbnails of pictures in the database.

The user can access pictures in the picture database by activating one of the four regions 104–110. The region 104 labeled "My Organization" is a hierarchical picture grouping iconic region indicating directories, folders and files containing pictures from the database. Using this region, the user simply opens directories, folders, files, etc. of interest to retrieve pictures. An example of a secondary/second display level appears in FIG. 2, where the user has opened a folder (labeled "Baby Joey") and has displayed the thumbnails of the pictures in that folder in the display area 102. The information box 116 has information derived from picture metadata about the pictures in the folder. The thumbnail explanation box 114 has metadata-derived information about the particular thumbnail highlighted (Image 1 of 9 in the example).

Figure 3:
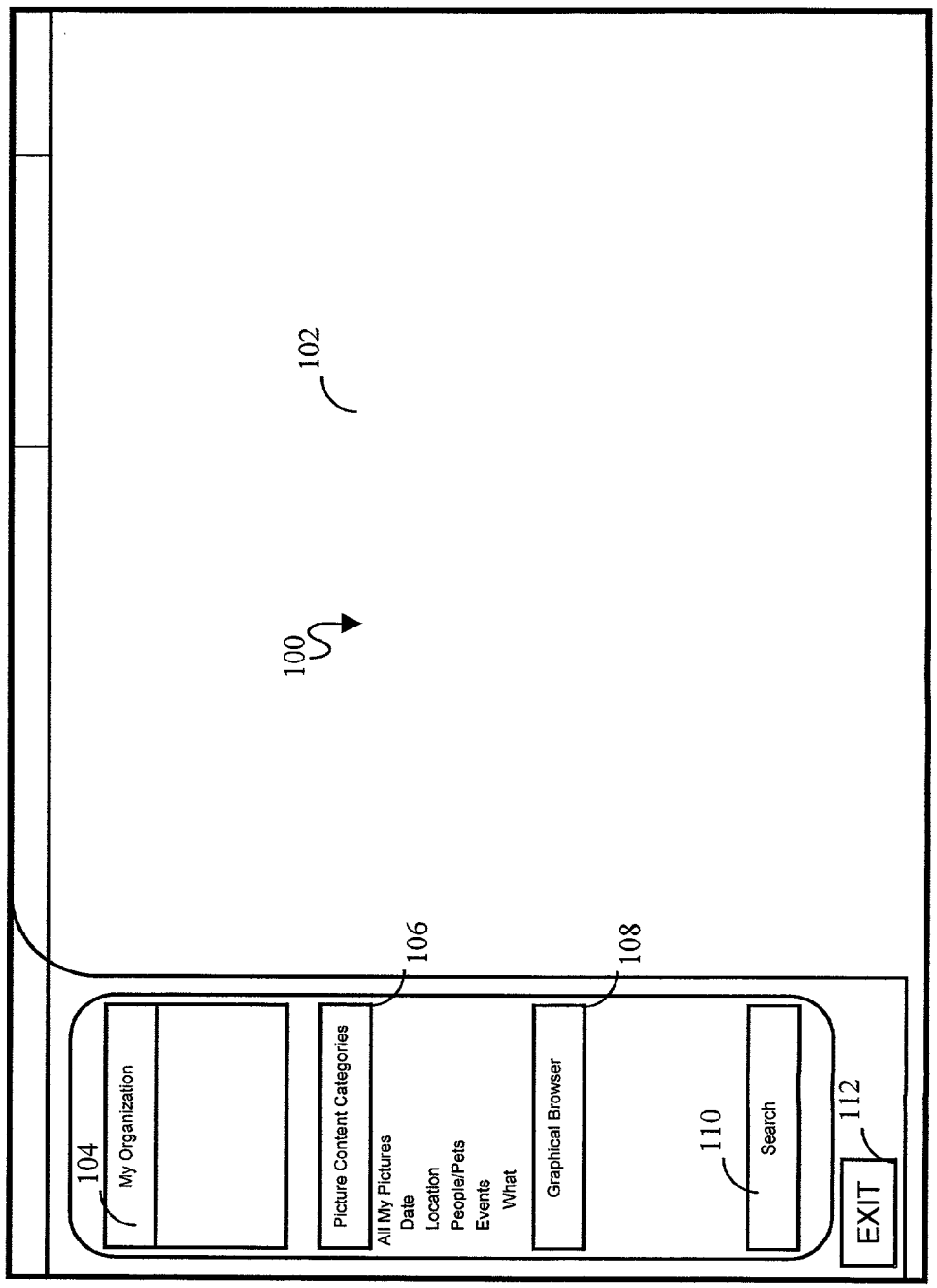
FIG. 3 is an example of a second display level of the present invention, highlighting a picture content iconic region, at least including icons representing pictures in the picture database according to predefined content categories and picture metadata.
Figure 4:
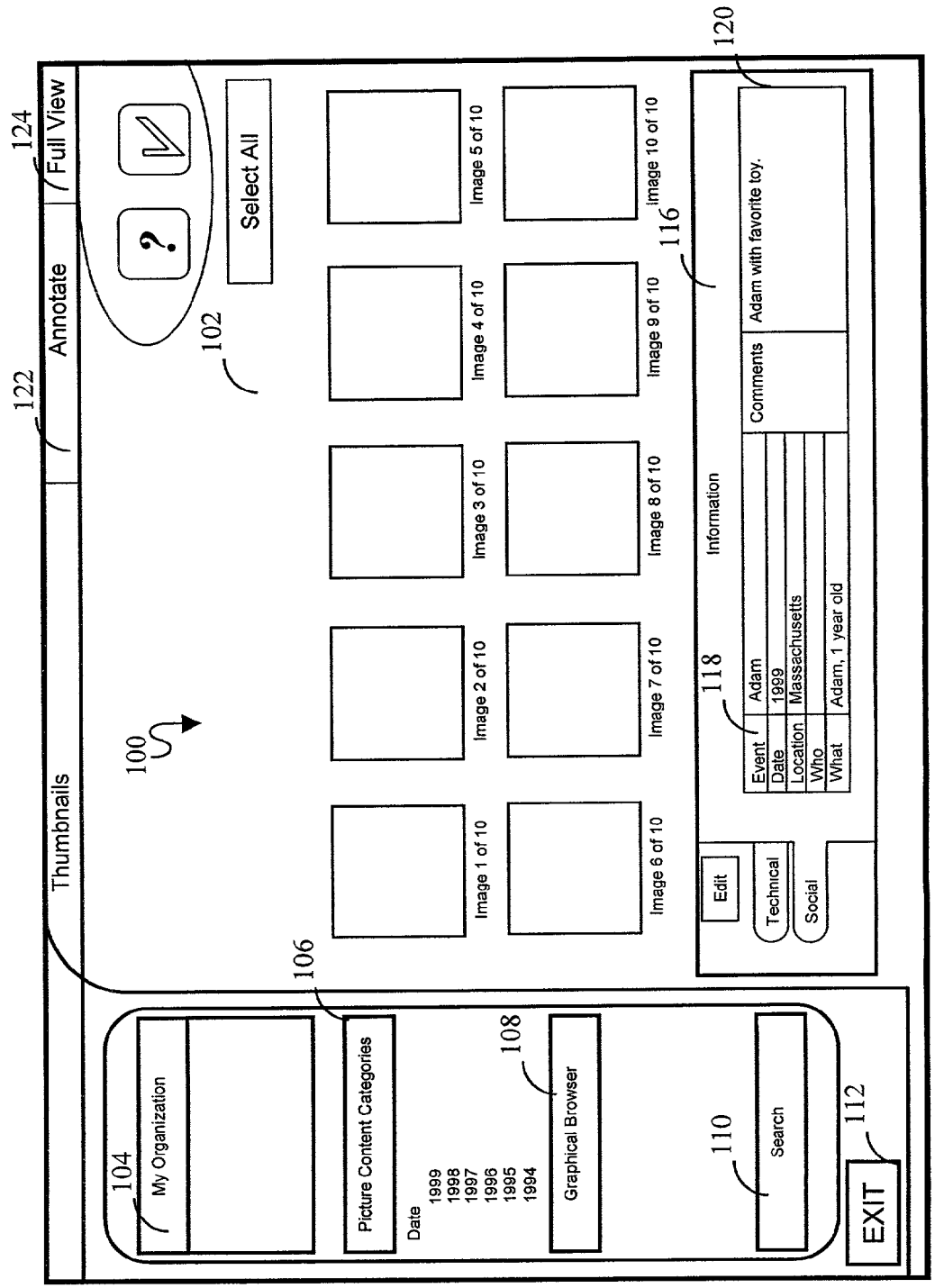
FIG. 4 is an example of a display level linked to the display level of FIG. 3, with thumbnails of pictures in the picture database captured in a selected year.
Figure 5:
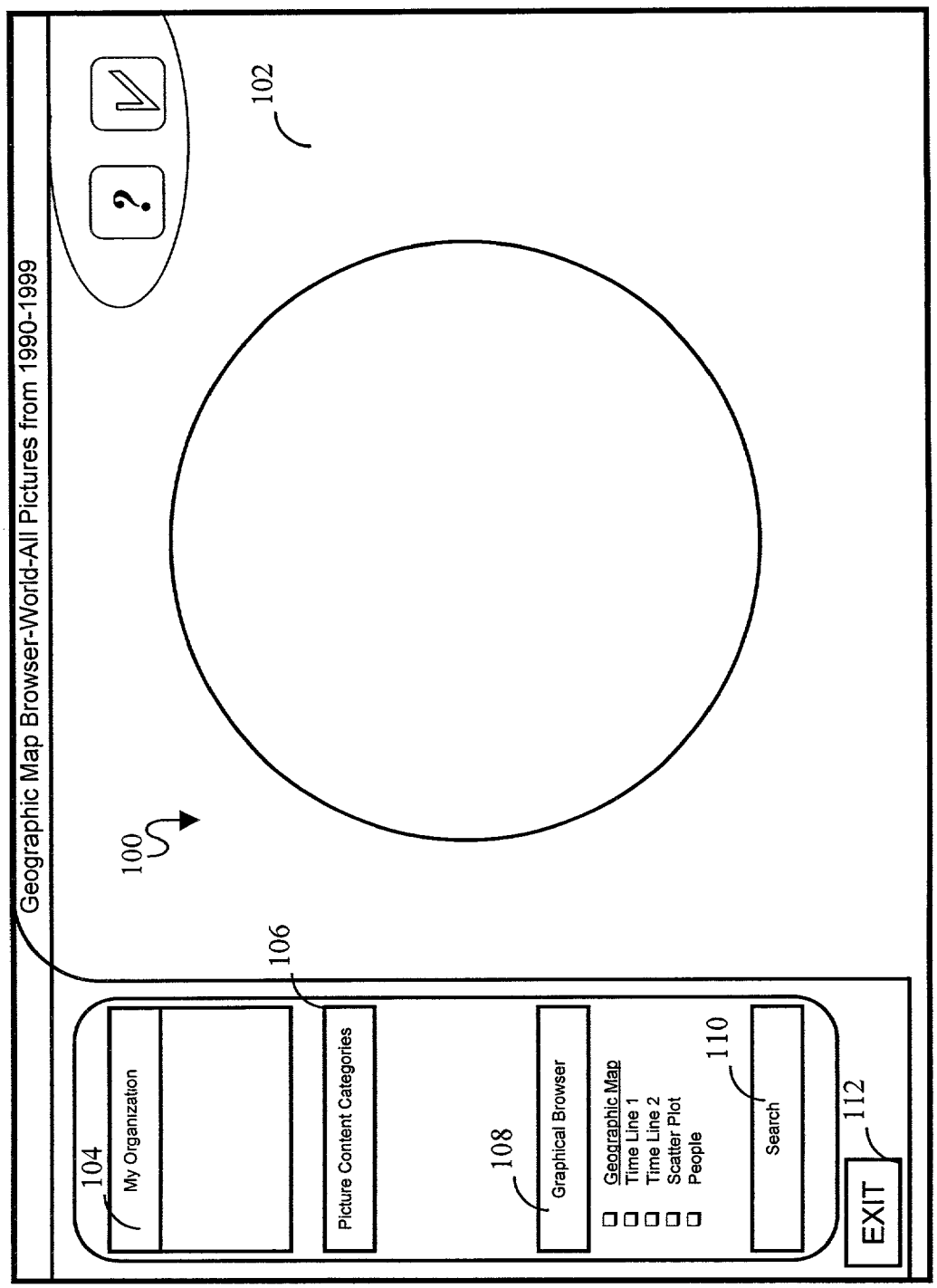
FIG. 5 is an example of a second display level of the present invention, in general, highlighting a graphical browser region, at least including indicia of graphical browsers utilized by the GUI, and including an example of a geographic map browser in particular.

Instead of browsing individual directories, folders, files and the like, the user may desire to activate the "Picture Content Categories" region (or picture content iconic region) 106. That region has icons representing pictures in the picture database according to predefined content categories and picture metadata (See FIG. 3). In the example of FIG. 5, the user has decided to view pictures according to the "Date" category. The display area 102 shows that for the chosen year (1999), there are ten pictures in the picture database. The information box contains information derived from the picture metadata about the pictures in this particular year, such as that the subject of the pictures is "Adam," that he was a one-year-old when the pictures were captured in Massachusetts, and that he is playing with his favorite toy. It is readily apparent from FIG. 3, that many other picture content categories are possible.

Figure 6:
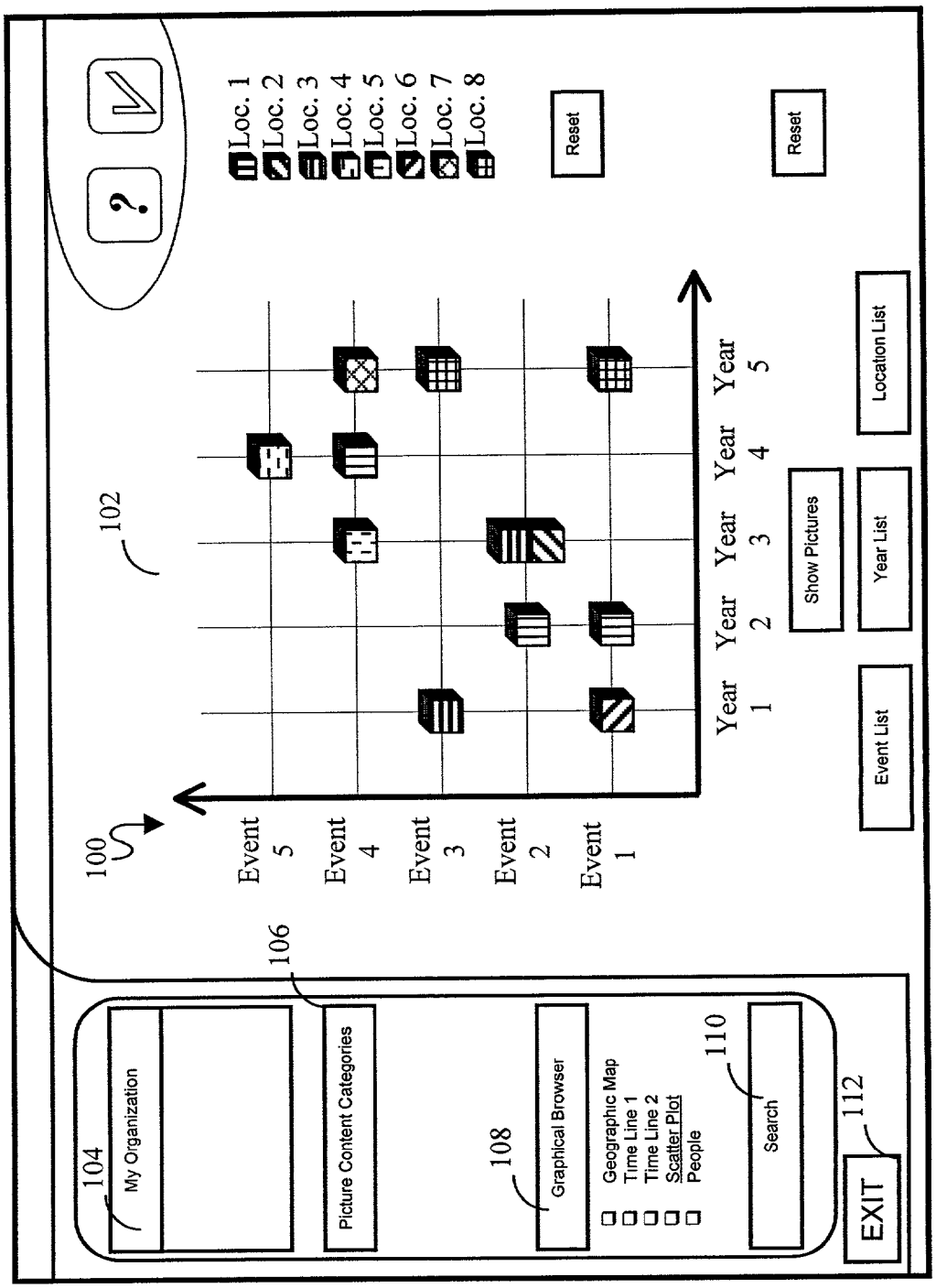
FIG. 6 is an example of a second display level of the present invention, in general, highlighting a graphical browser region, at least including indicia of graphical browsers utilized by the GUI, and including an example of a scatter plot browser in particular.

FIGS. 5 and 6 are illustrative of a user activating the "Graphical Browser" iconic region 108 to choose to browse the picture database with specific browsing methods utilized by the GUI, which methods may be inventive in their own right. In the example of FIG. 5, the user has chosen a geographic map browser with icons (not shown) located at picture capture locations on a map such as a picture of a globe (in the display area 102). Activating an icon produces another display with thumbnails of the pictures captured at the particular location represented by the icon.

In the example of FIG. 6, the user has chosen a three-dimensional scatter plot browser with icons, and with first and second axes representing separate category information, and the third dimension being determined by the visual nature of the icons, and representing a third category of information. It is readily apparent from FIGS. 5 and 6 that other graphical browsers can be used with the present invention.

A user can choose to navigate the pictures in the picture database by activating the "Search" region 110 of the present-inventive GUI. This permits the user to use Boolean searches and other advanced word-search methods available in the present-inventive GUI.

Variations and modifications of the present invention are possible, given the above description. However, all variations and modifications which are obvious to those skilled in the art to which the present invention pertains are considered to be within the scope of the protection granted by this Letters Patent.

PARTS LIST

100 Graphical user interface (GUI) main display level
102 GUI main display area
104 Hierarchical picture grouping iconic region
106 Picture content iconic region
108 Graphical browser region
110 Word search region
112 GUI exit button
114 Thumbnail explanation area
116 Information box/area
118 Picture information area
120 Picture comment area
122 Annotation view button
124 Full view button

What is claimed is:

1. A graphical user interface (GUI) adapted to browse pictures stored in a picture database, said GUI comprising:
   a main level display providing links to other display levels, said main level display comprising:
   a hierarchical picture grouping iconic region indicating directories, folders and files containing pictures from said database;
   at least one main display area adapted to at least display pictures, thumbnails and graphical browsers;
   a picture content iconic region, comprising a plurality of selectable icons, each representing a content category and associated with a display level with pictures from said picture database having content of a selected content category and grouped according to picture metadata;
   a graphical browser region comprising selectable indicia of at least two graphical browsers utilized by said GUI, each indicia associated with a display level, with one of said display levels having a geographical map with icons located at picture locations on a map and another one of said display levels having a plot representing on one axis one characteristic of the images in the database and representing on another axis another characteristic of the images in the database; and
   said GUI further enabling access to the display levels linked to said main display level via one or more of the icons in said main display level upon selection of an icon or indicia thereof.

2. The GUI in claim 1, wherein said main display area is further adapted to display word search indicia, and said main display level further comprises a word search area comprising indicia of word search methodologies utilized by said GUI.

3. The GUI in claim 1, wherein said content categories at least include picture capture date according to picture metadata.

4. The GUI in claim 1, wherein said content categories at least include picture capture location according to picture metadata.

5. The GUI in claim 1, wherein said content categories at least include predefined events to which pictures pertain, according to picture metadata.

6. The GUI in claim 1, wherein said content categories at least include persons depicted in pictures according to picture metadata.

7. The GUI in claim 1, wherein said graphical browsers at least comprise geographic maps constructed with the aid of picture metadata.

8. The GUI in claim 1, wherein said graphical browsers at least comprise timeline metaphors constructed with the aid of picture metadata.

9. The GUI in claim 1, wherein said plot comprises a scatter plot constructed with the aid of picture metadata.

10. The GUI in claim 1, wherein said graphical browsers at least comprise people-based graphical representations constructed with the aid of picture metadata.

11. The GUI in claim 2, wherein said content categories at least include picture capture date according to picture metadata.

12. The GUI in claim 2, wherein said content categories at least include picture capture location according to picture metadata.

13. The GUI in claim 2, wherein said content categories at least include predefined events to which pictures pertain, according to picture metadata.

14. The GUI in claim 2, wherein said content categories at least include persons depicted in pictures according to picture metadata.

15. The GUI in claim 2, wherein said graphical browsers at least comprise geographic maps constructed with the aid of picture metadata.

16. The GUI in claim 2, wherein said graphical browsers at least comprise timeline metaphors constructed with the aid of picture metadata.

17. The GUI in claim 2, wherein said graphical browsers at least comprise scatter plots constructed with the aid of picture metadata.

18. The GUI in claim 2, wherein said graphical browsers at least comprise people-based graphical representations constructed with the aid of picture metadata.

19. The GUI in claim 2, wherein said word search methodologies comprise Boolean searches.

20. The GUI in claim 1, further comprising indicia of graphical browsers utilized by said GUI.

21. A method for presenting pictures from a picture database in an organized graphical user interface, the method comprising:

generating a main display level on a display, with the main display level having a picture content iconic region, and a graphical browser region and a hierarchical picture grouping iconic region;

with said hierarchical picture grouping iconic region indicating directories, folders and files containing pictures from said database, with said picture content iconic region providing a plurality of icons each icon representing a content category and associated with a display level that is linked to the main display level, said linked display level having a group of pictures therein said group of pictures comprising a portion of pictures from the database having content associated with a selected category and having related metadata, and with said graphical browser region comprising selectable indicia of at least two graphical browsers utilized by said GUI each indicia associated with a display level, with one of said display levels having a geographical map with icons located at picture locations on a map and with another one of said display levels having a plot representing on one axis one characteristic of the images in the database and on another axis another characteristic of images in the database, detecting a selection of an icon or indicia; and presenting a display level associated with the selected icon or indicia.

* * * * *